United States Patent [19]
Knedel et al.

[11] 3,751,985
[45] Aug. 14, 1973

[54] SAMPLE DIVIDER FOR A LIQUID BEING EXAMINED

[75] Inventors: Maximilian Knedel, Munich-Grunwald; Hans Krech, Melsungen; Dietrich Ockert, Obermelsungen; Philipp Schipper, Erlangen; Werner Haas, Uttenreuth; Klaus-Steffen Isensee, Erlangen, all of Germany

[73] Assignee: Siemens Aktiengesellschaft, Erlangen, Germany

[22] Filed: Apr. 27, 1971

[21] Appl. No.: 137,824

[30] Foreign Application Priority Data
Apr. 28, 1970   Germany.................. P 20 20 711.8

[52] U.S. Cl. ................ 73/423 A, 23/230 R, 73/53
[51] Int. Cl. ............................................. G01n 1/18
[58] Field of Search .......................... 73/53, 423 A; 346/33 ME; 356/39; 23/230 R

[56] References Cited
UNITED STATES PATENTS

| | | | |
|---|---|---|---|
| 3,533,744 | 10/1970 | Unger .............................. | 356/39 X |
| 3,266,298 | 8/1966 | Whitehead et al. ..................... | 73/53 |
| 3,320,618 | 5/1967 | Kuch et al. ......................... | 73/53 X |
| 3,503,265 | 3/1970 | Isreeli ............................. | 73/423 A |
| 3,526,125 | 9/1970 | Gilford et al. ....................... | 73/53 |
| 3,565,582 | 2/1971 | Young .......................... | 73/423 A X |
| 3,617,222 | 11/1971 | Matte.............................. | 356/39 X |

*Primary Examiner*—Richard C. Queisser
*Assistant Examiner*—Joseph W. Roskos
*Attorney*—Richards & Geier

[57] ABSTRACT

A sample distributor for a liquid substance being examined has containers for all samples and for individual sample portions along with a part inseparably connected therewith for receiving sample information. The distributor also includes a supply unit for total sample containers, a reader for reading the information of total sample containers, a store tank receiving the individual sample containers, a supply unit for forwarding the individual sample containers to a sample dosing device and an information transmitting device. The sample dosing device receives a predetermined amount of liquid corresponding to the actual investigation program from the total sample container and transmits it to the individual sample containers, while the information transmitting device transmits information received by the reader to the individual sample containers. There are also provided means receiving the filled individual sample containers provided with information, as well as a device steering and supervising the entire operation of the sample divider.

10 Claims, 11 Drawing Figures

PATENTED AUG 14 1973

INVENTORS:
M. Knedel, H. Krech, D. Ockert, P. Schipper, W. Haas and
K.-S. Isensee
BY: Richards & Geier
ATTORNEYS

INVENTORS:

M. Knedel, H. Krech, D. Ockert, P. Schipper, W. Haas and K.-S. Isensee

BY:

Richards & Geier

ATTORNEYS

INVENTORS:
M. Knedel, H. Krech, D. Ockert, P. Schipper, W. Haas and K.-S. Isensee
BY:
Richards y Geier
ATTORNEYS

SAMPLE DIVIDER FOR A LIQUID BEING EXAMINED

This invention relates to a sample distributor for a liquid being examined.

When liquids are examined concerning the properties of their contents often more than a single parameter is of interest. Thus blood serum is analysed, for example, concerning blood sugar, urea, creatinine and other components. In case of sewage of interest are, for example, carbonate content, number of germs, toxicity. As further examples can be indicated analysis of pharmaceutical liquids for charge control and examinations of suspensions in the microbiology. These numerous investigations are mostly carried out with the same test sample. The available total amount of the test sample must be divided into smaller individual sample parts. As a rule, individual sample parts of different sizes are required for different analysis. The individual sample parts must be collected and placed in order so as to be transmitted to different analysing locations or laboratories.

In addition to the manipulation of the sample probe it is also necessary to carry out manipulation of information pertaining to the sample probe. Such information consists mostly of identifying data, for example, the number of the probe and often other additional information, such as treatment requirements, for example, the type of analysis. Parallel to the distribution of the sample parts, this information must be transmitted fully or partly with a great extent of precision.

At the present time the division of a liquid being examined into separate sample parts takes place generally by hand, for example, by the use of pipettes or by decanting.

The application of information pertaining to a sample part also takes place manually at this time, for example, by inscribing and applying stickers.

Since division into separate sample parts and transmission of information permit only a very small extent of error, this work must be carried out by reliable specialized personnel. Particularly in examining institutions where such work is carried out as a matter of routine, for example, in clinical-chemical laboratories, this results in an unnecessarily high amount of specialized employees. Despite this it happens, and not rarely, that a substance to be examined, which is mostly available only in small quantities is waisted or spoiled by improper treatment. It can also happen that the information despite all care is not transmitted properly and clearly. The resulting wrong diagnosis can cause a wrong treatment of patients and produce dangerous complications. But even the mere loss of time for examination caused by mistakes can have bad effects in clinical operation.

Auxiliary devices for the filling of a liquid being tested are known in the art. Furthermore, as far as data compilation is concerned, there are numerous examples as to how information can be transmitted electrically from one information carrier, for example, a perforated card, to another information carrier. However, the above-described drawbacks are not completely eliminated with these devices. Furthermore, their operation is too complicated.

An object of the present invention is to mechanize the heretofore mostly manually operated devices and make possible an automatic and simultaneous division of sample probes and transmission of information.

Other objects will become apparent in the course of the following specification.

In the accomplishment of the objectives of the present invention it was found desirable to provide a sample distributor for examining liquids which consists of containers for all samples and for individual sample portions with a part inseparably connected therewith for receiving sample information, a supply unit for the total sample containers, a reader for reading information of the total sample containers, a store tank receiving the individual sample containers, a supply unit for forwarding the individual sample containers to a sample dosing device and an information transmitting device. The sample dosing device receives a predetermined amount of liquid corresponding to the actual investigation program from a total sample container and transmits it to individual sample containers, while the information transmitting device transmits the information received by the reader at the total sample container to the individual sample containers. The sample divider also includes means receiving filled individual sample containers provided with information and a steering device which actuates and supervises the entire operation of the sample distributor.

The invention will appear more clearly from the following detailed description when taken in connection with the accompanying drawings showing by way of example only, a preferred embodiment of the inventive idea.

The term "total sample container" is used herein to describe a container initially filled with the liquid to be examined. This liquid is then divided among several so-called "individual sample containers" each of which is used to carry out a specific test.

Figure 1:
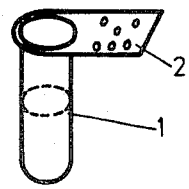
FIG. 1 is a perspective view a container for either the entire amount of liquid to be tested or for a single sample probe for use in the sample distributor of the present invention.

FIG. 1 shows a container 1 for the sample liquid and a part 2 hung upon the container and inseparably connected therewith, which carries the information.

Information is supplied to the container on the one hand in a form which is read by a machine and also in a visually readable manner. The writing readable by machine can consist of all types of mechanically, electrically or pneumatically identifiable symbols, such as holes forming a perforated strip or magnetized sections forming a magnetic band. It is also possible to provide markings in the form of black or colored point-like areas, blackenings of photo-sensitive layers produced by light action, deepenings in the material in the shape of grooves or ribs, or the like. The visually readable indicia can be impressed, printed or embossed.

Containers for the entire amount of the liquid being examined and containers for the separate sample probes of the liquid do not have to be of the same shape. Furthermore it is not necessary to apply the transmitted information in the same manner; instead it is possible to use different systems which are adapted to the shape of the container and the part of information being transmitted, whereby the connection can be produced by electronic or pneumatic intermediate elements.

Figure 2:
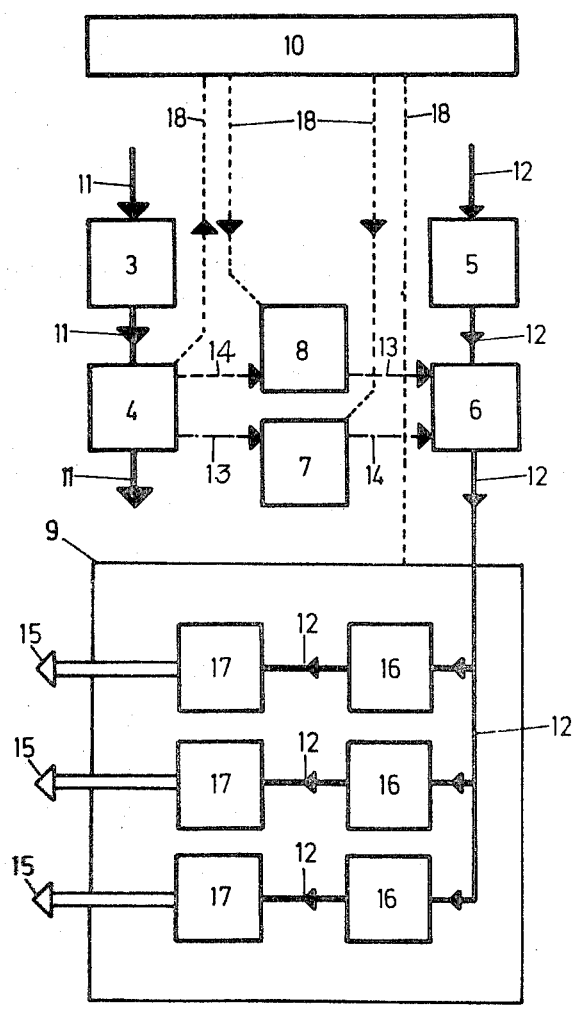
FIG. 2 is a diagram illustrating the total assembly of the sample distributor of the present invention.

The sample distributor of the present invention consists of the following parts which are illustrated diagrammatically in FIG. 2:

Supply unit 3 for the total sample containers.
Reader 4 for the total sample containers.
Store tank 5 for the individual sample containers.
Supply unit 6 for the individual sample containers.
Sample dosing device 7,
Information transmitting device 8.
Sorting device 9.
Electronic actuating device 10.

The passage of the total sample containers is indicated by heavy lines 11 in FIG. 2.

The supplying device 3 for the total sample containers is a transporting unit which transmits the total sample containers to the reader 4 and moves them away after the reading.

Figure 3:
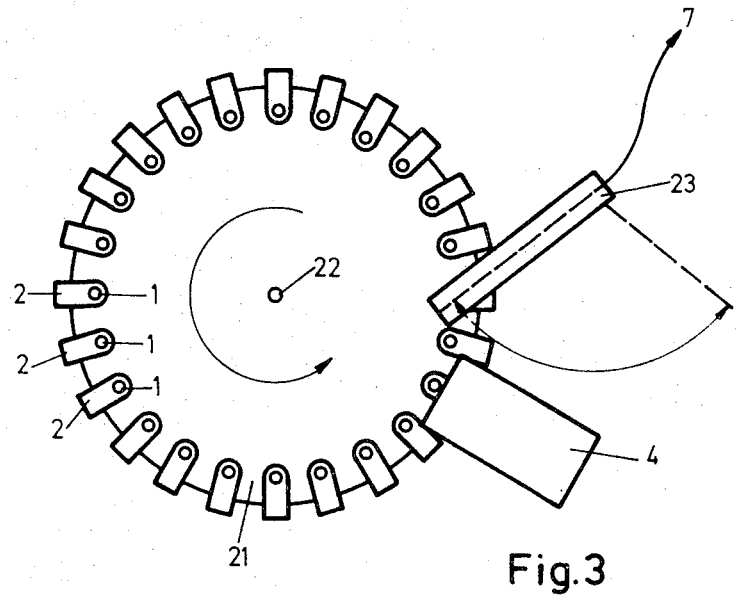
FIG. 3 shows the supply unit for the total sample containers.

An embodiment of the supplying device 3 is illustrated in FIG. 3.

All the total sample containers 1 provided with the information carriers 2 are placed by hand upon a rotary plate 21 which is turned stepwise and counterclockwise about an axle 22 by an adjustable motor. Thus the containers reach one by one first the reader 4 and then the suction device 23 of the probe dosing device 7. At the suction device 23 the tubes of the probe dosing device 7 are inserted into the containers to remove the necessary amount of liquid. After the containers have passed beyond the two stations they can be removed either by hand or by an automatic removing device for further use or to be preserved until the results of the analysis are available. Amounts of liquid which have not been removed remain as a reserve and can be used for a repeated analysis, if necessary.

The reader 4 for the total sample containers consists of a device which receives mechanically information contained upon the total sample containers and transforms it into electrical or pneumatic signals. If the information upon the total sample containers is in the form of perforations, as shown in FIG. 1, then the reader consists of a signal receiver known as perforation reader which transforms the position of holes into electrical impulses.

The path of individual sample containers is indicated by lines 12 in FIG. 2.

The store tank 5 for the individual sample containers is a collecting tank into which a larger amount of individual sample containers can be introduced in any desired manner.

Figure 4:
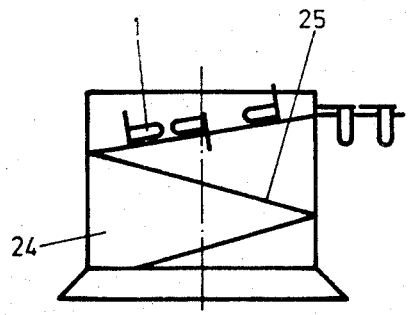
FIG. 4 is a side view of a store tank for the individual sample containers.

An embodiment of the store tank is illustrated in FIG. 4:

The containers 1 are dropped in any suitable way into a cylindrical tank 24. The inner surface of the tank has a spirally rising channel 25. The cylinder 24 is caused to carry out rotary oscillations by a magnetic drive or a balancing motor. Then the containers 1 gradually move upwardly along the channel 25 and by additional guides are placed in a vertical position in which they leave the tank 24.

The movement of the sample is indicated by broken lines in FIG. 2.

The supply unit 6 arranges the containers for individual samples, which have not been filled as yet and are not provided with any information, so that they move in the correct position to the information transmitting device 8 and the sample dosing device 7.

Figure 5:
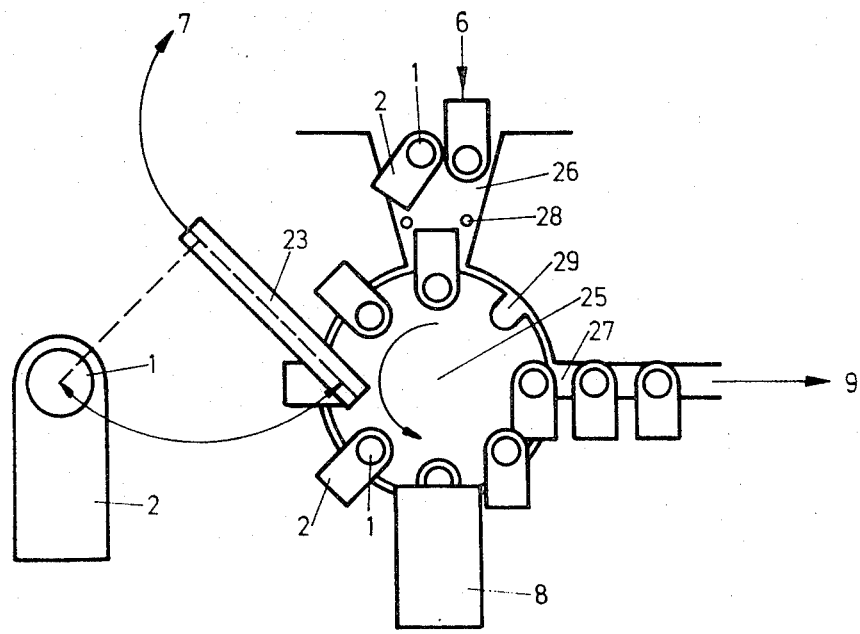
FIG. 5 shows the supply unit for the individual sample containers.

An embodiment of the supply unit 6 is illustrated in FIG. 5:

The individual sample containers 1 with the information carriers 2 fixed thereon arrive from the store tank 5 by an inlet guide 26, the position of the information carriers being adjusted by guide pins 28. The containers 1 are received in recesses 29 of a rotary plate 25 which is rotated stepwise and counterclockwise by a motor. During these stepwise movements the containers 1 first reach the suction device 23 of the sample dosing device 7 where they are filled with the predetermined amount of liquid; then they reach the information transmitter 8 and finally they are removed by a guide into a channel 27 where they are taken over by the sorting device 9.

The sample dosing device 7 (FIG. 2) removes the necessary sample amount of liquid from the total sample container and pours it stepwise in the required amounts into the individual sample containers. The sample dosing device 7 may consist, for example, of a pump operating a liquid and having sufficiently constant transmitting volume as well as the capacity of reversing the pumping direction. The pumped amount is indicated during the running of the pump by a time switch. The pump is connected by a lengthy hose with a tube which is sunk by a motor into total sample containers to withdraw the liquid being sampled and which thereupon is guided by a motor or a pneumatic device over the individual sample containers to fill them with a predetermined amount of liquid.

According to another construction the pump for the liquid can be a hose pump of known construction wherein the number of revolutions in the one or the opposite direction determines the pumped in amount and the pumped out amount and whereby the number of revolutions of the pump can be counted and predetermined by means of a counter.

Figure 6:
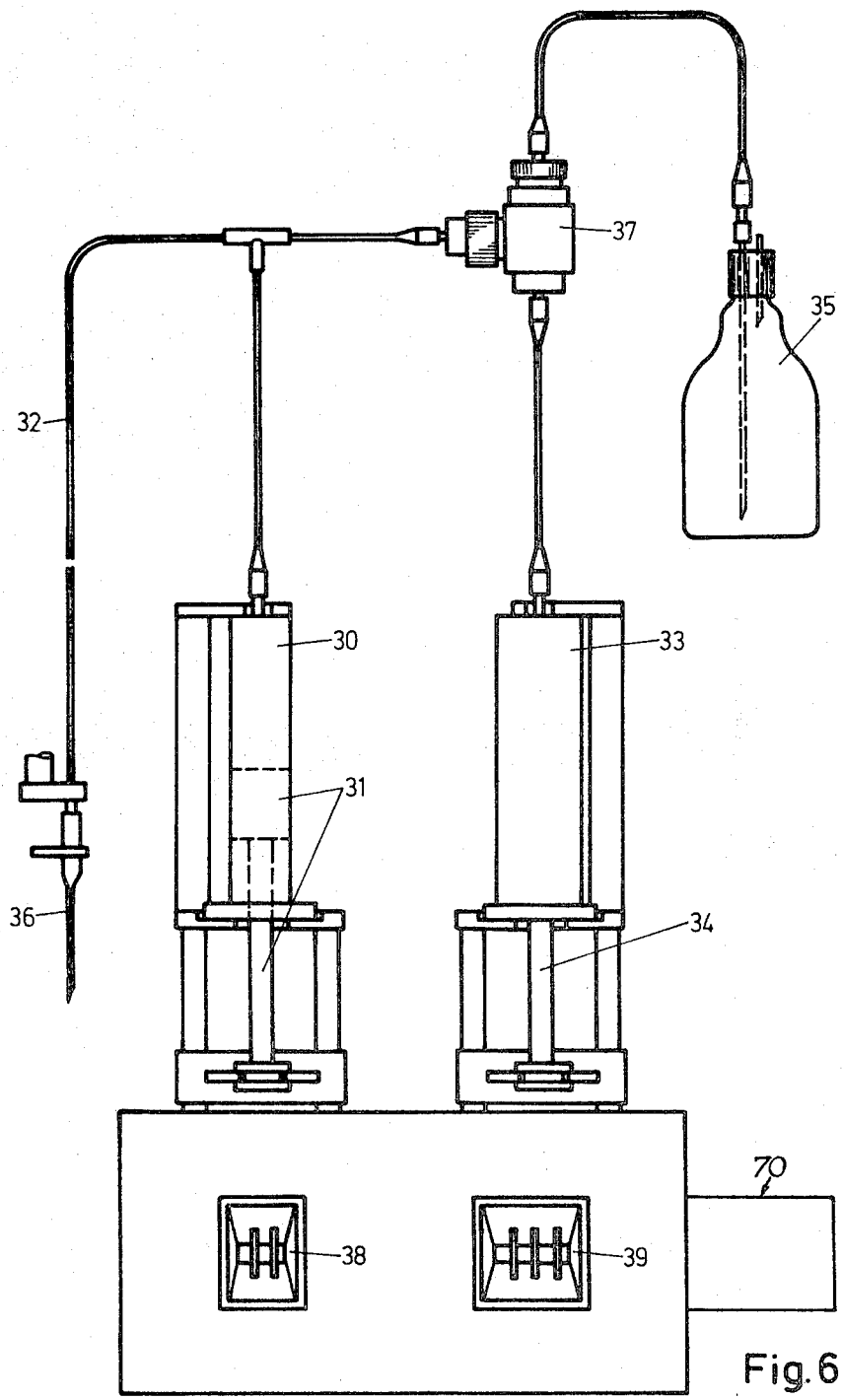
FIG. 6 is a side view of a probe dosing device.

A further construction is illustrated as the embodiment of FIG. 6:

Here the liquid operating pump is a motor driven burette 30, 31. The received and discharged amounts of liquid are determined by the stroke of the piston 31. The piston is driven by a spindle which is rotated by a driving motor. In this case also the number of revolutions of the motor 70, or if a step motor is used, the number of actuating impulses supplied to the motor 70, is a measure for the amount of liquid.

Of the above-described constructions the motor burette is most suitable as complying with the requirements of a high dose precision. The hose connection 32 from the burette to the tube 36 is so long that the received liquid does not reach the burette but remains in the hose. If after the transfer of the liquid into the individual sample containers the hose 32 is scoured with a washing liquid from a supply bottle 35 until it is empty, for which purpose a second motor burette 33, 34 of similar construction and a valve 37 are used, there is actually no possibility that one liquid probe will be transmitted into the following one.

The information transmitting device 8 (FIG. 2) is used for transmitting the entire information or a part of the information from the total sample container to the individual test container. The flow of the information is indicated in FIG. 2 by broken-point lines 14. If the writing readable by a machine consists, for example, of perforations as carriers of information upon the individual sample containers, then the transmitter of information is a punching machine. If magnetized sections are used as indicia, then the transmitter of information is an electro-magnetic device. In a similar manner the transmitter of information can be constructed as a printing device or a stamping device for providing the information.

Figure 7:
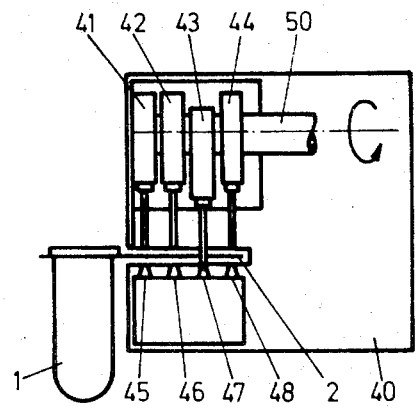
FIG. 7 shows an information transmitter.

An embodiment of the information transmitter is shown in FIG. 7:

The information carrier 2 of the container 1 passes through a slit in the casing of the puncher 40. A ram 41–44 and a matrix 45–48 are arranged to correspond to each hole of a column of the information to be punched. The rams can be operatively electromagnetically actuated from the electronic actuating device 10 through the drive 50 producing an excentric movement of the rams 41–44 through the holes of the matrixes 45–48 and through the information carrier to provide it with information carrying holes. When a column is provided with the required holes, the container 1 is moved forward by a short step so that the next column to be punched is placed between the rams and the matrixes. The visually readable inscription is applied in one of the ways described in connection with the total sample containers.

The sorting device 9 (FIG. 2) consists of a transmitting system which moves the individual sample containers provided with sample liquid and information and sorts them according to types of analysis. The sorting takes place in that an outlet 15 of the device 9 is provided for each type of analysis or groups. The number of outlets depends upon the number of required analysis. FIG. 2 shows only three outlets. An intermediate feeder 16 is provided for each passage in the transmitting system. This intermediate feeder is used to receive incoming individual sample containers when more of them arrive than can be collected at the outlets. The intermediate feeder 16 prevents the clogging of the device when collectors 17 for the individual sample containers are overfilled. These containers arriving at the outlets of the sorting device are arranged in the collectors 17 on plates, showcases, holders or the like and are supplied manually or mechanically to the individual analysis locations or laboratories.

Figure 8:
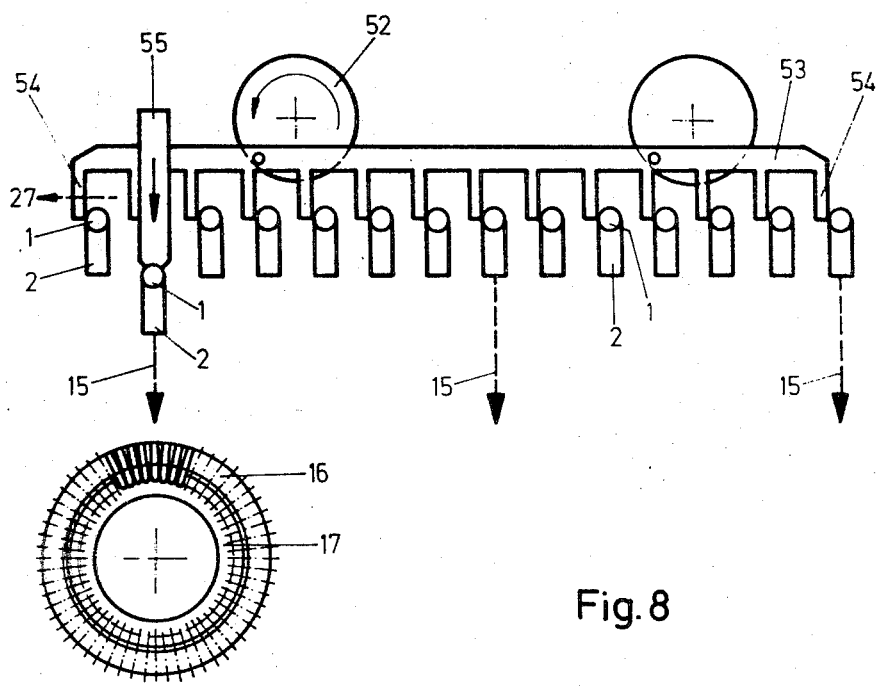
FIG. 8 is a top view of a sorting device.

FIG. 8 illustrates an embodiment of a sorting device shown from the top. An excenter wheel 52 is rotated step-wise by a motor (not shown) and is connected with a push rod 53 which is shaped as a comb due to the provision of parallel projections 54 extending perpendicularly to the rod. The projections 54 engage in the lower position of the rod 53 the containers 1 in the guiding channel 27 of the test guide shown in FIG. 5. Due to the transverse movement of the rod 53 produced by the wheel 52 the containers 1 are pushed forward to a predetermined amount. When the rod 53 is then moved upwardly the projections 54 are raised from the containers but after the completion of a full excentric rotation they engage the following containers and again move them forward. Thus the containers move stepwise in the sorting device. In the outlet locations 15 of the sorting device there are pushers 55 only one of which is shown in FIG. 8. These pushers can be actuated by an electromagnet, a motor with gear drive or a pneumatic device; they push the container located in front of them into an intermediate feeder 16 from which it reaches the container collector 17. Arrangements are provided to make certain that the pushers will be actuated only when during the excenter movement the rod 53 is in the dead point, i.e., it does not carry out a transverse movement. On the other hand the driving motor of the excenter 52 is so connected with the actuating electronic device 10 (FIG. 2) that it receives its voltage only when the individual test containers coming from the test guide are ready to be taken over. Thus the containers pass through the sorting device in an uninterrupted sequence. If necessary, the transporting system of the sorting device 9 (FIG. 2), preferably the intermediate feeder 16, can be provided with control liquids for the operation of the analysing devices. This makes possible in a simple manner a continuous control of the analysing devices or of the persons serving them.

Figure 9:
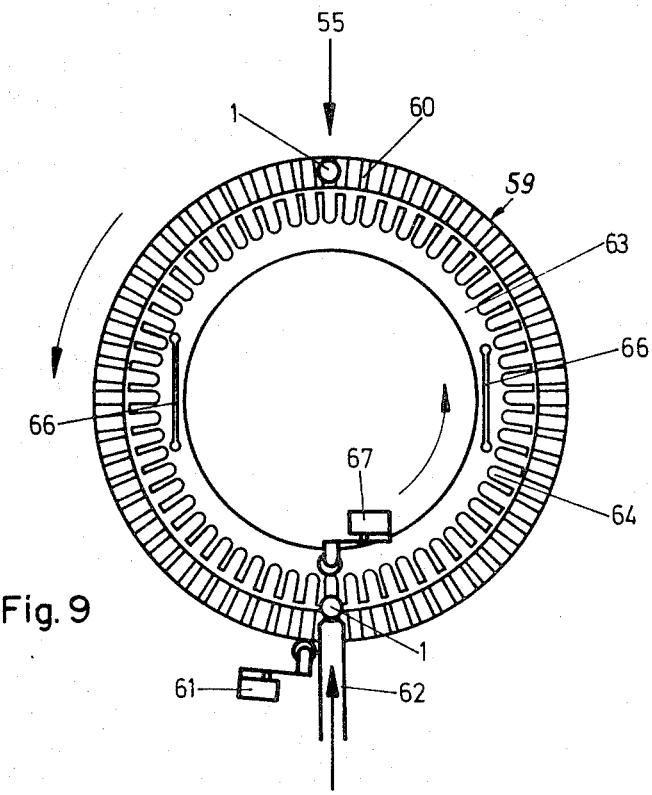
FIG. 9 is a diagram illustrating parts of the sorting device.
Figure 10:
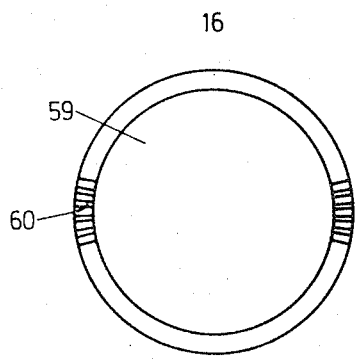
FIG. 10 is a diagram illustrating the intermediate feeder.
Figure 11:
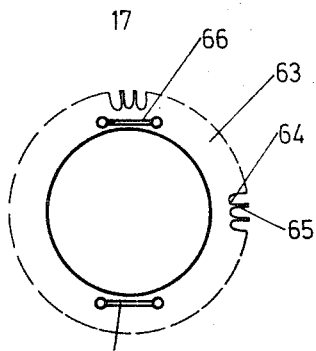
FIG. 11 is a diagram illustrating the container collector.

An embodiment of the intermediate feeder 16 and of the container collector 17 (FIG. 2) is illustrated in FIGS. 9 to 11:

The intermediate feeder 16 consists of a plate 59 carrying upon its circumference a number of radial ribs 60. The containers are shifted by a pusher 55 of the sorting device (FIG. 8) into spaces between the radial ribs. As soon as the pusher 55 is moved back into its original position, a contact is released which provides the rotation of the plate 59 and thus a further movement of a container 1 located between the ribs 60. The rotation is by an angle of about 180°. At this location there is a switch feeler 61 which determines the arrival of the container 1 and at the same moment stops the drive of the plate 59. When the container on the plate is brought to a standstill, it is pushed by the pusher 62 into the inner ring 63. The inner ring 63 has slits 64 corresponding to the intermediate spaces of the ribs 60 of the plate 59; these slits receive the containers 1 and are provided with small spring clamps to prevent the containers from falling out. A switch feeler 67 supervises the placing of the container into the ring 63 and switches off the motor driving the ring 63 as soon as the container has reached its end position. Then the motor moves the ring further to the extent of a circumferential position in which an empty slit 64 is placed in front of the pusher device 62. The ring 63 is gradually filled by the continuous movement of containers 1 from the spaces of the plate 59, into the slits 64 of the ring 63. When the feeler 67 determines that no more free space is left for introducing a container, a light signal is actuated which indicates to the operator that the ring 63 must be replaced. This can be carried out in a simple manner by the use of two hand grips 66 attached to the outer surface of the ring. The ring along with the containers located thereon is then brought to the working locations of the laboratory.

The actuating electronic device 19 (FIG. 2) operates all the functions of the sample distributor. It contains, in the first place, an intermediate collection of information read from the total sample containers before they are forwarded to the information transmitter and, furthermore, it includes a row of supervisory switch devices which eliminate an erroneous treatment or a false function of the sample distributor. For example, the total sample container can be only read if it is properly positioned in the reader. Furthermore liquid can be removed from the total sample container only when the reading step is completed. The actuating electronic device also determines what total amount of liquid should be removed on the basis of desired process numbers located as information on the total sample container and which individual partial amounts should be then supplied to the individual sample containers. The relations between the process numbers and the passages, as well as between the process numbers and the amounts of liquid to be filled are set before the beginning of a distribution upon a switchboard. Preferably the switchboard consists of decimal switches 38, 39 (FIG. 6) so that the operator can read off the desired numeric values when setting. If the distribution takes place continuously in the same manner, a new setting of the board is not necessary. A new setting is only required when the distribution procedure is changed, for example, when carrying out other processes with containers collected in the individual passages of the sorting device.

The actuating electronic device 10 can arrange the separate filled individual sample containers in the different passages of the sorting device in different ways. Each outlet location of the sorting device can contain a further reading device which reads off the process numbers transmitted by the information transmitting device to the individual sample container and compares it with the process number of the outlet passage in which the individual sample container is located. If these two numbers are the same, the container is pushed out, but not otherwise. Another possibility consists, for example, in that the process numbers are guided by a shifting registering device parallel to the containers, so that the location of the process number in the registering device will correspond to the location of the container in the sorting device. In that case the number provided in the passage is compared with information supplied to the registering device at that location. If the numbers are the same the container is pushed out. If the numbers are not the same the container continues to move until it reaches the correct withdrawing position of the sorting device.

The electronic actuating device can release optical and acustical warning signals when, for example, one of the channels of the sorting device is filled and cannot receive any more containers. Furthermore, it can stop the operation of the entire apparatus if a disturbance sets in which requires the action of an operator.

The operation of the sample distributor will be now again described summarily for better understanding:

The total sample containers are transmitted by the supplying device 3 to the reader 4. The reader receives the information provided upon the total test containers, namely the sample numbers and the testing programs. The actuating electronic device 10 operates the information transmitter 8 and the desired portions of information contained in the total sample container and possibly additional data are applied upon an individual test container. Furthermore, the actuating electronic device adds the different liquid amounts to be sampled which are to be removed from the total sample container and operates the probe dosing device 7 in such manner that these amounts are removed from the total sample container. During the next step the desired liquid amount for individual testing is poured by the probe dosing device 7 into the corresponding individual sample container. The individual sample container is transmitted to the distributor by use of the transporting system of the sorting device 9 and is placed in its predetermined outlet in the collector of individual sample containers. This takes place normally without delays in the intermediate collecting device 16. In case the sample collector 17 is full and must be exchanged, the individual sample containers will be gathered temporarily in the intermediate collector 16. When an empty individual sample collector 16 is inserted, the collecting procedure is resumed.

To attain the greatest possible distribution frequency, the times of the steps of the different procedures are interrelated. Thus, for example, a new total sample container can be supplied and information upon it read while the amount of liquid removed from a previous container is still being divided among the corresponding individual sample containers. Furthermore the previously filled individual sample containers still pass through the sorting device while new individual sample containers are already being provided with information and filled.

According to the present invention the information upon the sample containers can be applied in a different manner, for example, it can be inscribed or impressed upon a circumferential surface of the container extending axially beyond its bottom.

We claim:

1. A sample distributor for a liquid being examined, comprising total sample containers, individual sample containers, information carrying members firmly connected with said containers, a supply unit for said total sample containers, a reader for reading information upon said total sample containers, a store tank receiving said individual sample containers, a supply unit for said individual sample containers, a sample dosing device, an information transmitting device, the last-mentioned supply unit transmitting said individual sample containers from said store tank to said dosing device and said information transmitting device, said dosing device having means removing a predetermined amount of liquid from a total sample container and transmitting it to said individual sample containers, said information transmitting device having means receiving information upon a total sample container from said reader and transmitting it to said individual sample containers, means receiving said individual sample containers when they are full and provided with information and an actuating device for actuating and supervising all operations, said actuating device being controlled by the reader and operating the dosing device to determinate the liquid amount transmitted to the individual sample containers.

2. A sample distributor in accordance with claim 1, wherein the means receiving the individual sample containers comprise a sorting device having outlets and means distributing said individual sample containers among said outlets depending upon the type of analysis to be carried out.

3. A sample distributor in accordance with claim 1, wherein said reader is a device for reading perforations.

4. A sample distributor in accordance with claim 1, wherein said information transmitting device consists of a perforation puncher.

5. A sample distributor in accordance with claim 1, wherein said sample dosing device comprises a liquid transmitting burette and a motor driving said burette.

6. A sample distributor in accordance with claim 5, wherein the amount of transmitted liquid depends upon the number of revolutions of said motor.

7. A sample distributor in accordance with claim 5, wherein the amount of transmitted liquid depends upon the number of actuating impulses transmitted to said motor.

8. A sample distributor in accordance with claim 2, wherein means distributing the individual sample containers comprise a rod having a plurality of parallel projections, an excenter actuating said rod, said projections intermittently engaging said individual sample containers and moving them stepwise, and pushers moving the individual sample containers separately into different outlets.

9. A sample distributor in accordance with claim 2, wherein said sorting device comprises a container collector located adjacent said outlets and comprising at least one rotary ring having slits receiving said individual test containers.

10. A sample distributor in accordance with claim 9, wherein said container collector further comprises a plate enclosed by said ring and having radial ribs and spaces between the ribs for said individual sample containers, and means cooperating with said plate for transporting said individual sample containers from said outlets to said container collector, said means storing said individual sample containers when the container collector is full.

* * * * *